Figure 1:
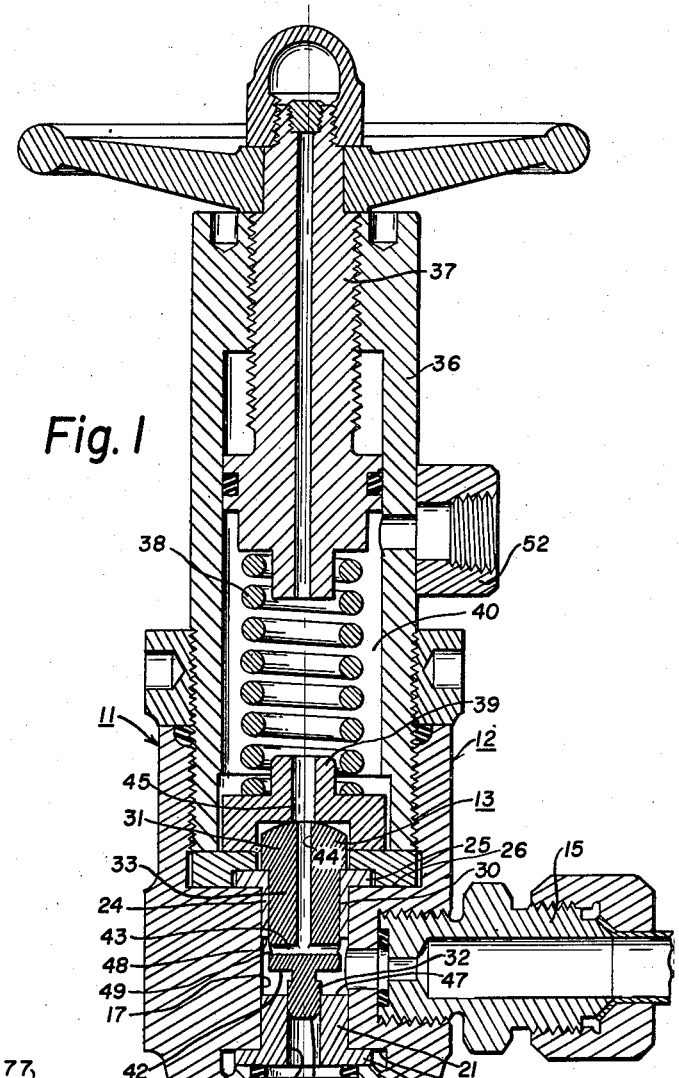

March 4, 1958  G. M. GEIGER  2,825,309
DIRECTLY OPERATED SEQUENCE VALVE
Filed Oct. 24, 1955

INVENTOR.
GEORGE M. GEIGER
BY Woodling and Krost,
attys.

United States Patent Office 2,825,309
Patented Mar. 4, 1958

2,825,309

DIRECTLY OPERATED SEQUENCE VALVE

George M. Geiger, Mount Gilead, Ohio, assignor, by mesne assignments, to Koehring Company, Milwaukee, Wis., a corporation of Wisconsin Application October 24, 1955, Serial No. 542,347

3 Claims. (Cl. 121—46.5)

The invention relates in general to hydraulic valves and more particularly to admission or directly operated sequence valves which open at a predetermined pressure setting to admit fluid to a utilization device.

The prior art form of admission valves were designed to open at a predetermined pressure setting to thus admit fluid under pressure to a utilization device; however, when a utilization device, such as a piston and cylinder type of motor, had a relatively small volumetric capacity, any slight leakage of fluid through the admission valve prior to the time it was supposed to open would permit fluid to enter the fluid motor and move it. This could be detrimental to the proper operation of the hydraulic circuit in which the admission valve and fluid motor were used, especially if the fluid motor was used for control purposes because then the movement of the fluid motor would give a false control or indication.

The present invention therefore relates to admission valves wherein means has been provided to inhibit the effect of any fluid leakage through the admission valve at pressure settings less than the predetermined pressure setting of the admission valve.

Another object of the invention is to provide a leakage land and port in an admission valve which is open when the valve is normally closed and which closes just prior to the opening of the valve, so that any leakage through the admission valve at fluid pressures below the pressure setting will be conducted through the leakage land and port to a sump so as not to build up any fluid pressure in the main outlet port of the admission valve.

Another object of the invention in an admission valve having main land and port means which control the admission of fluid from a pressure source to a fluid motor is to provide an additional land and port means having conditions reverse to the main land and port means so that one is open when the other is closed.

Another object of the invention is to provide a simply constructed leakage bore and port in an admission valve to drain leakage fluid to a sump so that any fluid leakage through the main land and port of the admission valve does not create false control or indication or create any fluid pressure in the main outlet of the admission valve.

Another object of the invention is to provide a combined admission valve and fluid motor with fluid interconnections wherein, when the admission valve is closed, equal pressures are established on opposite faces of a piston in the fluid motor to prevent movement of the piston until the fluid pressure reaches the pressure setting of the admission valve.

Figure 2:
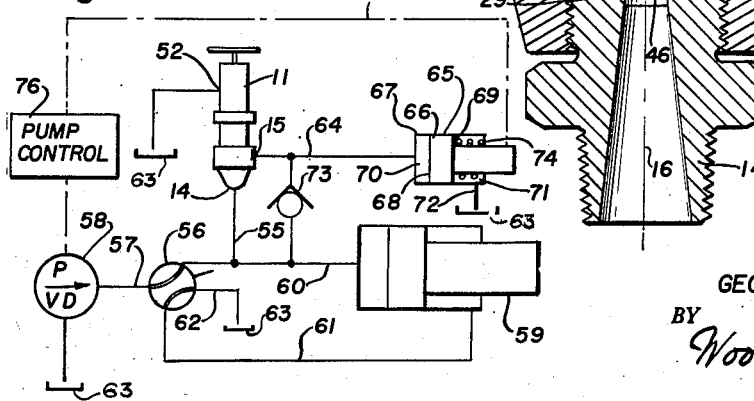

Other objects and a fuller understanding of this invention may be had by referring to the following description and claims, taken in conjunction with the accompanying drawing, in which:

Figure 1 is a longitudinal sectional view of an admission valve incorporating the invention; and Figure 2 is a schematic diagram of a hydraulic circuit in which the admission valve may be used.

The present invention is applied to an admission valve 11 having a body 12 and a valve member or spool 13. The body 12 has a fluid inlet 14 and a fluid outlet 15 which may be characterized as a main or a first inlet and outlet. The inlet 14 is positioned at one end of the valve body 12 along an axis 16 and is communicable with an axially aligned or longitudinal bore 17. A first flanged bushing 21 has the flange 22 thereof positioned against a surface 23 of the body 12 at the fluid inlet end of the body, and the main part of the bushing 21 extends into the longitudinal bore 17. A second flanged bushing 24 extends into the opposite end of the longitudinal bore 17 and has its flange 25 in engagement with a surface 26 of the body 12.

The first flanged bushing 21 has a first valve bore 29 which is smaller than a second valve bore 30 in the second bushing 24. The valve member 13 has a head 31 which bears against the flange 25 and also has first and second cylindrical portions 32 and 33. The first cylindrical portion 32 is slidably engageable with the first valve bore 29, and similarly the second cylindrical portion 33 is slidably receivable within the second valve bore 30.

A chamber body 36 is threaded into the valve body 12 and carries a threaded adjustment member 37 for adjustment of the compression of a compression spring 38. The lower end of this spring 38 engages a centering stud 39 which in turn bears against the head 31 of the valve member 13. The chamber body 36 thus forms a spring chamber 40 for the compression spring 38.

A shoulder 42 separates the first and second cylindrical portions 32 and 33 on the valve spool 13. Near this shoulder is positioned a cross bore 43 extending through the second cylindrical portion 33. An axial leakage bore 44 is provided in the valve spool 13 extending through the head 31 and second cylindrical portion 33 to provide communication from the cross bore 43 to the spring chamber 40. An axial bore 45 in the centering stud 39 permits such fluid communication.

The second cylindrical portion 32 may be considered a first land cooperating with a first port which is the first valve bore 29 to provide open and closed positions of the admission valve and in the open position to provide communication between the fluid inlet 14 and fluid outlet 15. The compression of the spring 38 establishes the predetermined pressure setting, determined by the setting of the adjustment member 37, and resists the opening of the admission valve 11 until the fluid force at the inlet 14, acting on the face end 46 of the cylindrical portion 32, exceeds the force of the spring 38. The face end 46 of the valve spool 13 has been made small in area so that high pressures may be resisted by a weaker spring, although this is a matter of design for the particular range of fluid pressures with which the valve 11 is to be used.

The first land and port means 32—29 is overlapped or closed by a considerable distance, in this case a predetermined distance between the surface 47 on the end of the flanged bushing 21 and the face end 46. A face end 48 of the second bushing 24 is spaced from the lower edge 49 of the cross bore 43 by a distance slightly less than the aforesaid predetermined distance. The lower edge 49 of the cross bore 43 thus becomes a leakage port and the face end 48 of the bushing 24 becomes a leakage land, and this land and port means 48—49 controls fluid communication between the main outlet 15 and a sump or vent outlet 52 which is connected to the spring chamber 40. Because the axial distance between the land 48 and the port edge 49 is less than the predetermined distance between the face end 46 of the spool 13 and the surface 47, it will be noted that as the spool 13 moves upwardly, as viewed in Figure 1, the leakage land and port means 48—49 is first closed and subsequently the main land and port means 32—29 is open. This will be as the valve spool 13 is moved upwardly at the predetermined pressure setting of the valve 11.

The Figure 2 is illustrative of one of many typical hydraulic circuits in which this admission valve 11 may be used. Figure 2 shows the admission valve 11 with the inlet 14 connected by a conduit 55 to a four-way valve 56. The inlet of the valve 56 is connected by a conduit 57 to pump 58 which may be a variable delivery variable pressure pump. A ram and cylinder unit 59 receives fluid under pressure at either end of the ram through a conduit 60 or conduit 61, with the conduit 60 connected to the conduit 55. The conduit 61 is connected to another outlet of the four-way valve 56, with this valve also having an outlet 62 to a sump 63.

The main outlet of the admission valve 11 is shown at 15 as being connected to a conduit 64 which in turn is connected to a fluid motor or utilization device 65. This fluid motor 65 has a control piston 66 within a cylinder 67 with the piston 66 having first and second faces 68 and 69. The cylinder 67 has a relatively small volume of fluid at the space 70 acting on the piston face 68. The volume or space 71 at the face 69 is connected by a conduit 72 to sump 63, or alternatively may be connected to the conduit 61, depending on the use of the fluid motor 65. With line 72 connected to sump, a spring 74 may be provided to urge the piston 66 leftwardly. A check valve 73 interconnects the conduits 60 and 64 for fluid flow from conduit 64 to conduit 60. A pump control 76 controls the displacement of the pump 58, with this pump control 76 being controlled by the fluid motor 65 by means of the interconnection 77.

The operation of the circuit of Figure 2 is that, when the pump 58 is delivering fluid under pressure and the valve 56 is moved upwardly to the position shown, fluid under pressure will enter the lines 55 and 60. This pressure closes the check valve 73, and is operative on the face end 46 of the admission valve spool 13, and moves the ram 59 to the right. Fluid from the right end of the ram 59 returns through the conduit 61 through the valve 56 to sump 63. When the ram 59 performs its useful work, and the fluid pressure in the lines 55 and 60 builds up to a point where it exceeds the predetermined pressure as determined by the adjustment setting of the threaded members 37, the admission valve 11 opens at the main land and port 32—29. This provides fluid communication between the inlet 14 and outlet 15. This fluid pressure is then available to operate on the control piston 66. It moves this piston 66 to the right sufficiently to actuate the pump control 76 to reduce the displacement of the pump 58 just sufficiently to maintain the desired pressure on the ram 59. This might be 2500 pounds per square inch, for example, for a high pressure pump. When the admission valve 11 opens, the fluid pressure in line 55 is available against the combined areas of the face end 46 and the shoulder 42, and this larger area provides a greater upward force on the valve spool 13 to make sure that once the admission valve 11 opens it will remain open as long as the pressure stays above the predetermined pressure setting of the combined areas.

For initially increasing pressures in conduits 55 and 60 below the pressure setting of the valve 11, for example, at 2000 pounds per square inch, there is apt to be some slight fluid leakage at the land and port means 32—29. This fluid leakage, because of the relatively small volume 70 on the face of the control piston 66, would tend to move the control piston to the right if the leakage bore 44 and land 49 were not provided. This is a principal feature of the present invention because any such fluid leakage at the main land and port means 32—29 will be conducted by the cross bore 43 and axial bore 44 to the sump 63. Therefore, this leakage bore permits the same pressure, that is, atmospheric pressure, to be maintained on both faces 68 and 69 of the fluid motor 65.

In the circuit of Figure 2 if the valve 56 is moved downwardly, the spring 74 moves piston 66 to the left and fluid under pressure then enters the conduit 61 to move the ram 59 to the left in preparation for the next cycle of operation. The fluid may readily leave the volume 70 by passing through the check valve 73 to exit to sump through the conduits 60 and 62.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sequence valve for controlling the admission of hydraulic fluid from a fluid pressure source to a fluid utilization device, comprising, a valve body having an axis, a longitudinal bore in said body, a fluid inlet to said longitudinal bore, a spring chamber in said body opposite said fluid inlet, a surface in said longitudinal bore defining a leakage land, a headed valve member disposed in said longitudinal bore with the head adjacent said spring chamber, a fluid outlet in said valve body communicaitng with said longitudinal bore, a threaded adjustment member in the spring chamber end of said valve body, a compression spring disposed between said valve member and said threaded adjustment member for variable pressure adjustment settings of the opening condition of said valve in accordance with various adjustment conditions of said threaded adjustment member, said spring urging the head of said valve member into abutting relationship with said body to cause said valve member to extend into said longitudinal bore a predetermined distance beyond said fluid outlet for a completely closed position of said valve, a port in said valve member, said port in the completely closed position of said valve being spaced from said leakage land a distance no greater than said predetermined distance, a leakage bore longitudinally disposed within said valve member to said port to afford communication between said valve chamber and said spring chamber with said valve in said completely closed position, a sump outlet from said spring chamber, and means for connecting said fluid inlet to a fluid pressure source and for connecting said fluid outlet to a fluid utilization device, whereby any leakage of fluid between said fluid inlet and fluid outlet at said valve member and longitudinal bore at fluid pressures less than the pressure setting of said valve will be conducted to sump through said port and leakage bore, and whereby for fluid pressures in excess of said pressure setting said valve member is moved to close said port at said leakage land prior to the opening of communication from said fluid inlet to said fluid outlet, to prevent any leakage fluid pressure acting on said fluid utilization device until fluid pressures in excess of said valve pressure setting are encountered.

2. A sequence valve for controlling the admission of hydraulic fluid from a fluid pressure source to a fluid motor of relatively small volume, comprising, a valve body having an axis, a fluid inlet at one end of said body, a longitudinal bore in said body, an axially aligned spring chamber in said body opposite said fluid inlet, a first shoulder in said longitudinal bore establishing a leakage land, a smaller first and a larger second valve bore axially aligned in opposite ends of said longitudinal bore, said valve bores and said longitudinal bore defining a valve chamber, a headed valve member disposed in said valve chamber with the head thereof at said second valve bore end and spring chamber end of said longitudinal bore, a smaller first and a larger second cylindrical portion on said valve member slidably engageable within said first and second valve bores, respectively, a second shoulder between said first and second cylindrical portions, said fluid inlet communicable with said valve chamber through said first valve bore, a fluid outlet in said valve body communicating with said valve chamber at said longitudinal bore, a threaded adjustment member in the spring chamber end of said valve body, a compression spring disposed between said valve member and said threaded adjustment member for variable pressure adjustment settings of the opening condition of said valve in accordance with various adjustment conditions of said threaded adjustment member, said spring urging the head of said valve member into abutting engagement with said valve body to cause said first cylindrical valve member portion to extend into said first valve bore a predetermined distance for a completely closed position of said valve, a port in said second cylindrical valve member portion positioned near said second shoulder, said second cylindrical valve member portion being longer than said second valve bore, said port in the completely closed position of said valve being spaced from said leakage land by a distance slightly less than said predetermined distance, a leakage bore longitudinally disposed within said valve member extending through said head and said second cylindrical portion to said port to afford communication between said valve chamber and said spring chamber with said valve in said completely closed position, a sump outlet from said spring chamber, and means for connecting said fluid inlet to a fluid pressure source and for connecting said fluid outlet to a fluid pressure motor of relatively small volume compared to the volume of said valve chamber, whereby any leakage of fluid between said first valve bore and said first cylindrical valve member portion at fluid pressures less than the pressure setting of said valve will be conducted to sump through the port and leakage bore, and whereby for fluid pressures in excess of said pressure setting said valve first closes at said leakage land and port and subsequently opens at said first valve bore and first cylindrical portion, to prevent any leakage fluid pressure acting on said fluid motor until fluid pressures in excess of said valve pressure setting are encountered.

3. A sequence valve for controlling the admission of hydraulic fluid from a fluid pressure source to a fluid motor of relatively small volume, comprising, a valve body having an axis, a fluid inlet on said axis at one end of said body, a longitudinal bore in said body, an axially aligned spring chamber in said body opposite said fluid inlet, a first flanged bushing in the fluid inlet end of said longitudinal bore, a second flanged bushing in the spring chamber end of said longitudinal bore and having a face end, a first valve bore axially aligned in said first flanged bushing, a larger second valve bore axially aligned in said second flanged bushing, said first and second valve bores each extending approximately one-third the length of said longitudinal bore, said first and second valve bores and said longitudinal bore defining a valve chamber, a headed valve member disposed in said valve chamber with the head thereof engageable with the flange of said second flanged bushing, a small first and a large second cylindrical portion on said valve member slidably engageable within said first and second valve bores, respectively, a shoulder between said first and second cylindrical portions, said fluid inlet communicable with said valve chamber through said first valve bore, a fluid outlet in said valve body generally perpendicular to said axis and communicating with said valve chamber at said longitudinal bore, a threaded adjustment member in the spring chamber end of said valve body, a compression spring disposed between said valve member and said threaded adjustment member for variable pressure adjustment settings of the opening condition of said valve in accordance with various adjustment conditions of said threaded adjustment member, said spring urging the head of said valve member into engagement with the flange of said second flanged bushing to cause said first cylindrical valve member portion to extend into said first valve bore a predetermined distance for a completely closed position of said valve, a cross bore in said second cylindrical valve member portion positioned near said shoulder, said second cylindrical valve member portion being longer than said second flanged bushing, a portion of said cross bore adjacent said shoulder forming a leakage land, said leakage land in the completely closed position of said valve being spaced from said second bushing face end by a distance slightly less than said predetermined distance, a leakage bore longitudinally disposed within said valve member extending through said head and said second cylindrical portion to said cross bore to afford communication between said valve chamber and said spring chamber with said valve in said completely closed position, a sump outlet from said spring chamber, and means for connecting said fluid inlet to a fluid pressure source and for connecting said fluid outlet to a fluid pressure motor of relatively small volume compared to the volume of said valve chamber, whereby any leakage of fluid between said first valve bore and said first cylindrical valve member portion at fluid pressures less than the pressure setting of said valve will be conducted to sump through the cross bore and leakage bore, and whereby for fluid pressures in excess of said pressure setting said valve first closes at said leakage land and second bushing face end and subsequently opens at said first valve bore and first cylindrical portion, to prevent any leakage fluid pressure acting on said fluid motor until fluid pressures in excess of said valve pressure setting are encountered.

References Cited in the file of this patent

UNITED STATES PATENTS

| | | |
|---|---|---|
| 734,737 | Neil | July 28, 1903 |
| 1,134,608 | Gottschalk | Apr. 6, 1915 |
| 1,794,270 | Ackermann | Feb. 24, 1931 |
| 2,261,925 | Salzer | Nov. 4, 1941 |